July 17, 1928.
L. A. HAAS
ANTIBACK LASH ATTACHMENT FOR REELS
Filed Aug. 1, 1927
1,677,631
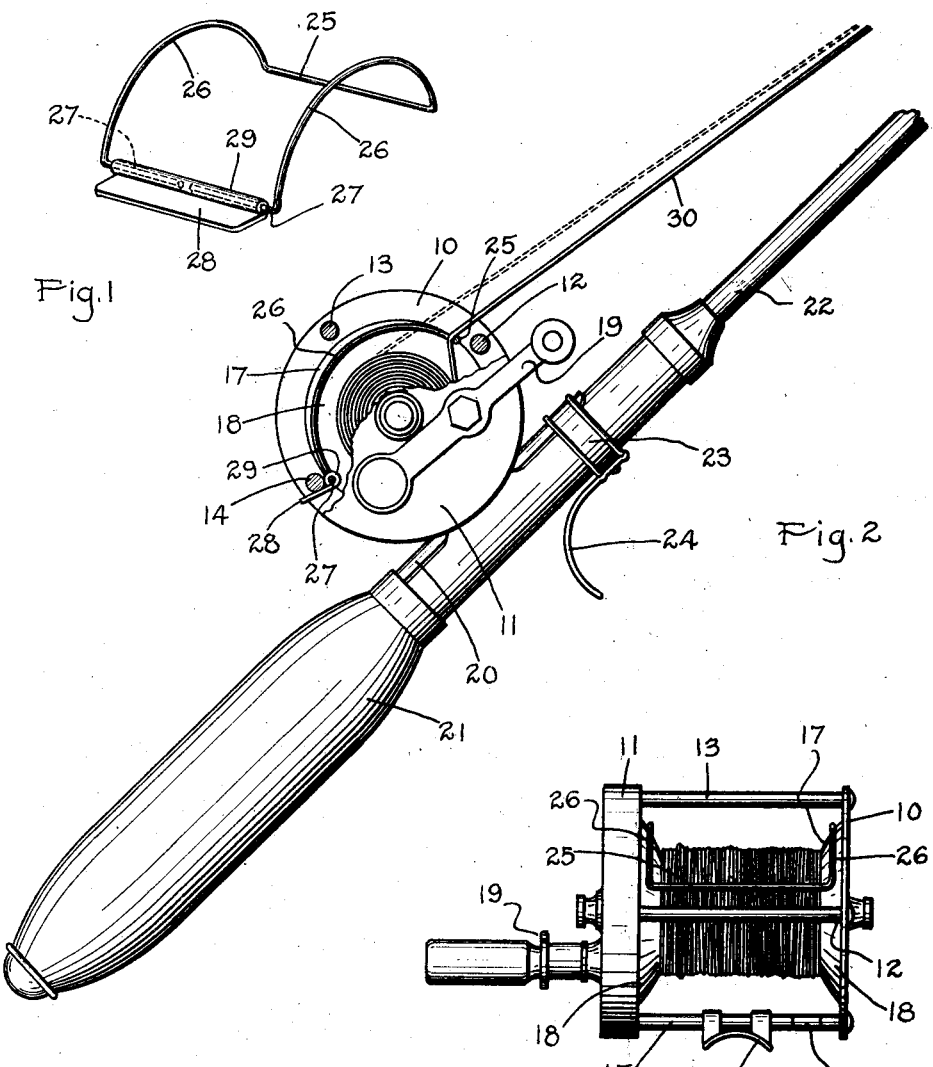
Inventor
Louis A. Haas
By Bradbury + Caswell
Attorney:

Patented July 17, 1928.

1,677,631

UNITED STATES PATENT OFFICE.

LOUIS A. HAAS, OF ST. PAUL, MINNESOTA.

ANTIBACKLASH ATTACHMENT FOR REELS.

Application filed August 1, 1927. Serial No. 209,859.

My invention relates to improvements in anti-back lash attachments for reels.

In casting with fishing rods equipped with reels of standard design, it frequently happens that a turn in the line about the spool of the reel is caught with sufficient tightness between adjacent turns of the line on the spool to cause the line to be drawn reversely under the rotating spool with the result that before the momentum of the spool is arrested, tangling of the line on the spool is experienced. Such tangling of the line, after the lure has been cast into moving water or from a moving boat, causes the caster considerable inconvenience in retrieving the lure with the line in tangled condition upon the reel, not to mention the laborious effort ofttimes required in untangling the line from the reel.

An object of my invention is to provide a simple, durable and effective attachment readily applicable to a standard reel and adapted to act as a brake against the reel spool, when the line to the reel is wound under the spool by accidental reverse rotation of the spool in casting.

More specifically it is my object to provide an attachment for reels having a head member against which a reversely winding line engages, said head member being connected with brake arms riding upon the flanges of the reel spool and provided with a fulcruming device disposed to engage a frame member of the reel and limit the forward movement of the attachment on the spool occasioned by the drag of a reversely winding line on said head member.

With the foregoing and other objects in view, which will appear in the following description, the invention resides in the novel combination and arrangement of parts and in the details of construction hereinafter described and claimed.

In the drawings, Fig. 1 is a perspective view of a reel attachment embodying my invention; Fig. 2 is a view illustrating a standard reel and rod, a portion of the former being broken away to disclose my attachment, which is illustrated in section in connection with said reel and Fig. 3 is a front elevation of a reel with my improved attachment applied thereto.

Reference being had to the drawing, it will be seen that the reel illustrated includes the usual parts, as follows: End plates 10 and 11, front tie member 12, top tie member 13, rear tie member 14 and bottom tie members 15 and 16, all connecting said plates 10 and 11. A spool indicated in its entirety by the numeral 17 is revolubly mounted between the end plates 10 and 11 and is formed with the customary flared flanges 18 at the ends thereof, said spool being geared in the customary manner (not shown) to the handle 19. A mounting plate 20, secured to the lower tie members 15 and 16 of the reel frame, is socketed at one end in the handle 21 of a casting rod 22 in the usual manner, the other end of said plate being removably caught beneath the usual clamp ring 23 having the customary finger piece 24 attached thereto.

My improved attachment is illustrated in its entirety in Fig. 1, the same including a wire bent into four-sided shape and comprising a head member 25. Arched brake arms 26 are turned back from said head member 25 and butt-pieces 27 turned inwardly in aligned relation from said brake arms 26. Said attachment also includes a fulcrum member or tab 28, said tab being turned along a margin thereof to form a sleeve 29. The aligned butt-pieces 27 are inserted in the sleeve 29 of tab 28, the fit between said butt-pieces and sleeve being relatively tight to prevent accidental turning of the fulcrum tab 28 on said butt-pieces 27 but permitting of the swinging movement of said tab on said butt-pieces by force intentionally exerted by the fingers of the user.

In applying the attachment to a reel, the fulcrum tab 28 is turned on the butt-pieces 27 into position extending in the general direction of the brake arms 26 at the rear thereof. With the fulcrum tab 28 thus disposed, the attachment is inserted into the reel, the tab foremost, beneath the upper tie member 13 of the reel frame, the attachment being then further slid along over the spool 17 until the fulcrum tab 28 reaches position beneath the rear tie member 14. In this position of the attachment, the fulcrum tab 28 is turned on butt-pieces 27 to bring the tab into the position shown in Fig. 2 at right angles to the rearward extremities of the brake arms 26. A line 30 wound upon the spool 17 of the reel is passed over the head member 25 of the attachment preparatory to threading said line through the usual eyelets (not shown) on the casting rod.

It will be observed that the brake arms 26 are spaced apart by means of the said member 25 and the fulcrum tab 28 so that said arms ride upon high portions of the flanges 18 of the reel spool 17. With said brake arms thus disposed with respect to the flanges of the spool, the attachment normally floats freely within the reel, the brake arms 26 lightly riding upon the spool frames. During such normal operation of the attachment, the line 30 is wound onto the spool 17 at the top thereof and normally paid off from said spool at its top. If a turn of the line becomes imbedded and caught between adjacent turns of the line on the spool, as may be occasioned under numerous circumstances in the reeling in of a line, it is found that said line does not pay out freely from the top of the spool upon the succeeding cast and a reel not equipped with means for preventing the back lash of the line often becomes fouled by the tangling of the line thereon due to the rewinding of the line under the spool by the momentum of the spool gained at the beginning of the cast. That such fouling of the reel can occur will become apparent when it is remembered that a turn of the line lodged between adjacent turns on a reel rapidly rotating in a clockwise direction, as seen in Fig. 2, may be sufficiently tightly caught between said adjacent turns that instead of paying off from the reel at the top thereof in a normal manner, it will be drawn back under the reel, as shown in solid lines, Fig. 2, with the result that before the rotation of the reel ceases, said line is matted and tangled on the reel much to the trouble of the caster, particularly if his lure has fallen in moving water or in still water from a moving boat.

In the operation of my improved attachment, the article floats idly upon the flanges 26 of the spool at all times in reeling in the line or casting out the same, except, during the casting out of the line, when a turn thereof has become wedged between adjacent turns on the reel and the wedged turn begins to be carried back underneath the spool. Such a circumstance as this is illustrated in Fig. 2 wherein it is shown that the line tending to wind back upon the reel underneath the spool is drawn down against the head member 25. This tightening of the line against said head member causes the attachment to be shifted forwardly upon the flanges 18 of the spool into position wherein the fulcrum tab 28 is brought against the rear tie member 14 of the reel frame. When said tab fulcrums against said tie member, the brake arms 26 of the attachment are drawn down against the flared flanges 18 of the spool with the result that a relatively powerful braking action against the rotation of said spool is effected by the attachment. Functioning quickly to arrest the momentum of the spool, the otherwise prolonged line entangling action of the spool is prevented with the result that a simple tug upon the line will release the wedged turn from the spool and return the line into normal position extending from the top of the spool. Having again obtained the normal relation of the line to the spool (dotted lines Fig. 2) the attachment again floats idly upon the spool 17 without effect, until a re-occurrence of the condition, above mentioned, when said attachment is actuated through the head member 25 by engagement of the line therewith to cause the fulcruming of the attachment on the rear tie member 14 of the reel frame with the consequent braking action of the brake arms 26 on the flanges 18 of the spool.

To remove the attachment from the reel it is only necessary to turn the fulcrum tab 28 downwardly into the position in which it is disposed when the attachment is threaded into the reel and thereafter draw the attachment out of the reel between the forward and upper tie members 12 and 13 of the reel frame.

My invention is particularly advantageous, not only for the reason that it is exceedingly simple and inexpensive, but also for the reason that it may be easily applied to and removed from a reel, and for the reason that it functions effectively without impediment to the normal actions of the user in casting and without the necessity of any attention or manipulation upon the part of the user.

Changes in the specific form of my invention, as herein disclosed, may be made within the scope of what is claimed without departing from the spirit of my invention.

Having described my invention, what I claim as new and desire to protect by Letters Patent is:

1. An article of the class described, including a length of wire bent into four-sided shape to form a head member over which a line from the spool of a reel is passed, two symmetrically arched arms bent back from the head member and adapted to ride the flanges of the spool, and aligned butt-pieces bent inward from said arms in parallelism with said head member, said article further including a fulcrum member comprising a tab having a marginal portion turned to provide a sleeve, said butt-pieces being fitted in said sleeve, said tab being adapted to be turned by force on said butt-pieces into position permitting the threading of the article butt end foremost into the reel inside of the tie members thereof and adapted thereafter to be turned into position to engage one of said tie members.

2. An article of the class described, including a length of wire bent into four-sided shape to form a head member over which a line from the spool of a reel may pass, arched arms bent back from said head member and adapted to ride the flanges of the reel spool, and aligned butt-pieces bent inward from said arms in parallelism with said head member, said article further including a fulcrum member fitted on said butt-pieces, said fulcrum member being adapted to engage a tie-member of the reel frame and limit the forward movement of the article within a reel.

3. The combination with a reel including frame plates, tie members connecting same and a spool journaled between said plates and formed with oppositely outwardly flared flanges, of an attachment comprising curved parallel arms adapted to ride the spool, one on one flange thereof and one on the other flange, a head member joining said arms at their forward extremities and adapted to pass beneath a line extending from said spool, and means associated with said arms at their rearward extremities to cause a fulcruming engagement between said arms and one of said tie members when the line is drawn against the head member, whereby a braking action is set up between said arms and the flanges of the spool.

4. A unitary attachment comprising a structure adapted to be floatingly mounted in a reel, said structure including braking members for riding the flanges of the reel spool, a stop device associated with said braking members for engagement with the frame of the reel, and a head member also associated with said braking members, said head member being adapted to be disposed beneath a line extending from said spool and to be engaged by said line in the backward winding in thereof to cause the shifting of the attachment on the reel, whereby the stop device is brought into engagement with the reel frame and the braking members are drawn against the spool flanges.

5. An attachment for reels comprising a brake arm adapted to ride upon a flange of a reel spool, a head member at the forward extremity of said arm adapted to underlie a line extending forwardly from the upper side of the spool, and means at the rearward extremity of said arm for engagement with the reel frame, said means providing a fulcruming connection between said arm and reel frame to cause braking contact of the arm against the spool flange when the line is drawn down against the head member in the accidental winding of the line on the spool at the bottom thereof.

In testimony whereof I have affixed my signature to this specification.

LOUIS A. HAAS.